United States Patent
Kwon et al.

(10) Patent No.: US 9,130,236 B2
(45) Date of Patent: *Sep. 8, 2015

(54) ELECTRODE FOR SECONDARY BATTERY, PREPARATION THEREOF, AND SECONDARY BATTERY AND CABLE-TYPE SECONDARY BATTERY COMPRISING THE SAME

(71) Applicant: LG Chem, Ltd., Seoul (KR)

(72) Inventors: Yo-Han Kwon, Daejeon (KR); Hye-Ran Jung, Daejeon (KR); Eun-Kyung Kim, Daejeon (KR); Je-Young Kim, Daejeon (KR); In-Chul Kim, Daejeon (KR); Hyo-Mi Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,919

(22) Filed: Sep. 9, 2014

(65) Prior Publication Data

US 2014/0377611 A1     Dec. 25, 2014

Related U.S. Application Data

(63) Continuation of application No. PCT/KR2014/004047, filed on May 7, 2014.

(30) Foreign Application Priority Data

May 7, 2013  (KR) .......................... 10-2013-0051565
May 7, 2014  (KR) .......................... 10-2014-0054279

(51) Int. Cl.
*H01M 10/04* (2006.01)
*H01M 4/04* (2006.01)
(Continued)

(52) U.S. Cl.
CPC ............ *H01M 10/0422* (2013.01); *H01M 2/14* (2013.01); *H01M 4/02* (2013.01);
(Continued)

(58) Field of Classification Search
CPC ............ H01M 10/04; H01M 10/0422; H01M 10/052; H01M 10/0525; H01M 10/0565; H01M 10/0567; H01M 10/0569; H01M 10/058; H01M 2220/20; H01M 2220/30; H01M 2300/0028; H01M 2300/0082; H01M 2/14; H01M 4/02; H01M 4/0404; H01M 4/043; H01M 4/13; H01M 4/366; H01M 4/485; H01M 4/5825; H01M 4/583; H01M 4/622; H01M 4/623; H01M 4/625; H01M 4/64; H01M 4/661; H01M 4/663; Y02E 60/122; Y02T 10/7011
See application file for complete search history.

(56) References Cited

U.S. PATENT DOCUMENTS 4,522,897 A     6/1985   Walsh
(Continued)

FOREIGN PATENT DOCUMENTS

JP            11297360         10/1999
(Continued)

OTHER PUBLICATIONS

International Search Report from PCT/KR2014/004047, dated Sep. 3, 2014.
(Continued)

*Primary Examiner* — Carlos Barcena
(74) *Attorney, Agent, or Firm* — Lerner, David, Littenberg, Krumholz & Mentlik, LLP

(57) ABSTRACT

A sheet-form electrode for a secondary battery includes a current collector; an electrode active material layer formed on one surface of the current collector; a porous organic-inorganic layer formed on the electrode active material layer and including inorganic particles and a polymer binder; and a first porous supporting layer formed on the porous organic-inorganic layer. The sheet-form electrode for a secondary battery has supporting layers on at least one surface thereof to exhibit surprisingly improved flexibility and prevent the release of the electrode active material layer from a current collector even if intense external forces are applied to the electrode, thereby preventing the decrease of battery capacity and improving the cycle life characteristic of the battery.

27 Claims, 3 Drawing Sheets

(51) Int. Cl.

| | | |
|---|---|---|
| *H01M 4/36* | (2006.01) | |
| *H01M 2/14* | (2006.01) | |
| *H01M 4/02* | (2006.01) | |
| *H01M 4/13* | (2010.01) | |
| *H01M 4/64* | (2006.01) | |
| *H01M 10/052* | (2010.01) | |
| *H01M 10/058* | (2010.01) | |
| *H01M 4/78* | (2006.01) | |
| H01M 10/0525 | (2010.01) | |
| H01M 10/0565 | (2010.01) | |
| H01M 10/0567 | (2010.01) | |
| H01M 10/0569 | (2010.01) | |
| H01M 4/485 | (2010.01) | |
| H01M 4/58 | (2010.01) | |
| H01M 4/583 | (2010.01) | |
| H01M 4/62 | (2006.01) | |
| H01M 4/66 | (2006.01) | |
| H01M 2/16 | (2006.01) | |

(52) U.S. Cl.
CPC ............... *H01M 4/043* (2013.01); *H01M 4/13* (2013.01); *H01M 4/64* (2013.01); *H01M 4/667* (2013.01); *H01M 4/78* (2013.01); *H01M 10/04* (2013.01); *H01M 10/052* (2013.01); *H01M 10/058* (2013.01); *H01M 2/162* (2013.01); *H01M 2/1653* (2013.01); *H01M 4/0404* (2013.01); *H01M 4/0409* (2013.01); *H01M 4/366* (2013.01); *H01M 4/485* (2013.01); *H01M 4/583* (2013.01); *H01M 4/5825* (2013.01); *H01M 4/622* (2013.01); *H01M 4/623* (2013.01); *H01M 4/625* (2013.01); *H01M 4/661* (2013.01); *H01M 4/663* (2013.01); *H01M 10/0525* (2013.01); *H01M 10/0565* (2013.01); *H01M 10/0567* (2013.01); *H01M 10/0569* (2013.01); *H01M 2220/20* (2013.01); *H01M 2220/30* (2013.01); *H01M 2300/0028* (2013.01); *H01M 2300/0082* (2013.01); *Y02E 60/122* (2013.01); *Y02T 10/7011* (2013.01)

(56) References Cited

U.S. PATENT DOCUMENTS

| | | | |
|---|---|---|---|
| 5,008,165 | A | 4/1991 | Schmode |
| 5,077,153 | A | 12/1991 | Grange-Cossou et al. |
| 5,478,676 | A | 12/1995 | Turi et al. |
| 6,165,645 | A | 12/2000 | Nishimura et al. |
| 6,280,879 | B1 | 8/2001 | Andersen et al. |
| 6,403,263 | B1 | 6/2002 | Roach |
| 6,723,467 | B2 | 4/2004 | Yoshida et al. |
| 7,682,740 | B2 | 3/2010 | Yong et al. |
| 8,895,189 | B2 | 11/2014 | Zhamu et al. |
| 8,945,752 | B2 | 2/2015 | Kwon et al. |
| 2001/0053475 | A1 | 12/2001 | Ying et al. |
| 2003/0215716 | A1 | 11/2003 | Suzuki et al. |
| 2005/0112461 | A1 | 5/2005 | Amine et al. |
| 2005/0118508 | A1 | 6/2005 | Yong et al. |
| 2005/0155216 | A1 | 7/2005 | Cho et al. |
| 2006/0008702 | A1 | 1/2006 | Cheon et al. |
| 2006/0110661 | A1 | 5/2006 | Lee et al. |
| 2006/0199294 | A1 | 9/2006 | Fujikawa et al. |
| 2007/0207379 | A1 | 9/2007 | Hatta et al. |
| 2008/0032170 | A1 | 2/2008 | Wainright et al. |
| 2008/0089006 | A1 | 4/2008 | Zhong et al. |
| 2009/0107746 | A1 | 4/2009 | Horie et al. |
| 2010/0216016 | A1 | 8/2010 | Seino et al. |
| 2010/0261065 | A1 | 10/2010 | Babinec et al. |
| 2010/0273051 | A1 | 10/2010 | Choi et al. |
| 2010/0273056 | A1 | 10/2010 | Kanda et al. |
| 2010/0285341 | A1 | 11/2010 | Yun et al. |
| 2010/0291442 | A1 | 11/2010 | Wang et al. |
| 2010/0316898 | A1 | 12/2010 | Howard et al. |
| 2011/0039140 | A1 | 2/2011 | Miyahisa et al. |
| 2011/0068001 | A1 | 3/2011 | Affinito et al. |
| 2011/0111277 | A1 | 5/2011 | Bessho et al. |
| 2011/0223470 | A1 | 9/2011 | Tomantschger |
| 2012/0009331 | A1 | 1/2012 | Kwon et al. |
| 2012/0034509 | A1 | 2/2012 | Bae et al. |
| 2012/0040235 | A1 | 2/2012 | Cho et al. |
| 2012/0077109 | A1 | 3/2012 | Hong et al. |
| 2012/0100412 | A1 | 4/2012 | Kwon et al. |
| 2012/0107658 | A1 | 5/2012 | Kwon et al. |
| 2012/0115040 | A1 | 5/2012 | Kwon et al. |
| 2012/0115259 | A1 | 5/2012 | Lee et al. |
| 2012/0141877 | A1 | 6/2012 | Choi et al. |
| 2012/0148902 | A1 | 6/2012 | Kwon et al. |
| 2012/0174386 | A1 | 7/2012 | Katayama et al. |
| 2012/0189914 | A1 | 7/2012 | Hara et al. |
| 2012/0295144 | A1 | 11/2012 | Kwon et al. |
| 2013/0011742 | A1 | 1/2013 | Park et al. |
| 2013/0089774 | A1 | 4/2013 | Chami |
| 2013/0143126 | A1 | 6/2013 | Jung et al. |
| 2013/0288150 | A1 | 10/2013 | Hodges et al. |
| 2013/0344363 | A1 | 12/2013 | Upadhyaya |
| 2013/0344368 | A1 | 12/2013 | Kwon et al. |
| 2014/0011065 | A1 | 1/2014 | Kwon et al. |
| 2014/0170454 | A1 | 6/2014 | Kwon et al. |
| 2014/0178726 | A1 | 6/2014 | Kwon et al. |
| 2014/0186672 | A1 | 7/2014 | Kwon et al. |
| 2014/0186673 | A1 | 7/2014 | Kwon et al. |
| 2014/0212720 | A1 | 7/2014 | Kwon et al. |
| 2014/0234681 | A1 | 8/2014 | Kwon et al. |
| 2014/0370351 | A1 | 12/2014 | Kwon et al. |

FOREIGN PATENT DOCUMENTS

| | | | | |
|---|---|---|---|---|
| JP | 2005038612 | A | 2/2005 | |
| JP | 2007265989 | A | 10/2007 | |
| JP | 2011054502 | A | 3/2011 | |
| KR | 20050043674 | A | 5/2005 | |
| KR | 2005-0075811 | A | 7/2005 | |
| KR | 100582557 | B1 | 5/2006 | |
| KR | 2008-0005627 | A | 1/2008 | |
| KR | 2008-0010166 | * | 1/2008 | ............ H01M 10/04 |
| KR | 20080010166 | A | 1/2008 | |
| KR | 20080015373 | A | 2/2008 | |
| KR | 20100117403 | A | 11/2010 | |
| KR | 2010-0130818 | A | 12/2010 | |
| KR | 2011-0038038 | A | 4/2011 | |
| KR | 2011-0136448 | A | 12/2011 | |
| KR | 20120000708 | A | 1/2012 | |
| KR | 2012-0014542 | A | 2/2012 | |
| KR | 20120094871 | A | 8/2012 | |
| KR | 2013-0040160 | A | 4/2013 | |
| KR | 20130040166 | A | 4/2013 | |
| KR | 2013-0045219 | A | 5/2013 | |
| WO | 2005098994 | A1 | 10/2005 | |
| WO | 2011159083 | A2 | 12/2011 | |
| WO | 2012088643 | A1 | 7/2012 | |

OTHER PUBLICATIONS

International Search Report for Application No. PCT/KR2014/004039 dated Sep. 11, 2014.
International Search Report for Application No. PCT/KR2014/004042 dated Sep. 11, 2014.
International Search Report for Application No. PCT/KR2014/004043 dated Sep. 11, 2014.
International Search Report for Application No. PCT/KR2014/004044 dated Oct. 1, 2014.
International Search Report for Application No. PCT/KR2014/004046 dated Oct. 1, 2014.
International Search Report for Application No. PCT/KR2014/004048 dated Sep. 12, 2014.
International Search Report from PCT/KR2014/003737, dated Aug. 14, 2014.
Machine Enlish Translation of JP 2005-038612.
Original Japanese text of JP 2005-038612.

(56) References Cited

OTHER PUBLICATIONS

U.S. Appl. No. 14/445,144, filed Jul. 29, 2014.
U.S. Appl. No. 14/472,635, filed Aug. 29, 2014.
U.S. Appl. No. 14/472,692, filed Aug. 29, 2014.
U.S. Appl. No. 14/477,305, filed Sep. 4, 2014.
U.S. Appl. No. 14/477,317, filed Sep. 4, 2014.
U.S. Appl. No. 14/479,713, filed Sep. 8, 2014.
U.S. Appl. No. 14/479,821, filed Sep. 8, 2014.
U.S. Appl. No. 14/479,856, filed Sep. 8, 2014.
U.S. Appl. No. 14/480,914, filed Sep. 9, 2014.
U.S. Appl. No. 14/480,926, filed Sep. 9, 2014.
U.S. Appl. No. 14/483,318, filed Sep. 11, 2014.
U.S. Appl. No. 14/483,328, filed Sep. 11, 2014.
U.S. Appl. No. 14/483,348, filed Sep. 11, 2014.
U.S. Appl. No. 14/483,373, filed Sep. 11, 2014.
U.S. Appl. No. 14/484,401, filed Sep. 12, 2014.
U.S. Appl. No. 14/484,454, filed Sep. 12, 2014.
U.S. Appl. No. 14/484,463, filed Sep. 12, 2014.
U.S. Appl. No. 14/484,472, filed Sep. 12, 2014.
U.S. Appl. No. 14/484,487, filed Sep. 12, 2014.
Y.H. Kwon, S.-W. Woo, H.-R. Jung, H.K. Yu, K. Kim, B.H. Oh, S. Ahn, S.-Y. Lee, S.-Wan Song, J. Cho, H.-C. Shin, J.Y. Kim, Cable-Type Flexible Lithium Ion Battery Based on Hollow Multi-Helix Electrodes, Adv. Mater. 2012, 24, 5192-5197.

\* cited by examiner

ELECTRODE FOR SECONDARY BATTERY, PREPARATION THEREOF, AND SECONDARY BATTERY AND CABLE-TYPE SECONDARY BATTERY COMPRISING THE SAME

CROSS-REFERENCE TO RELATED APPLICATION

This application is a continuation of International Application No. PCT/KR2014/004047 filed on May 7, 2014, which claims priority under 35 USC 119(a) to Korean Patent Application No. 10-2013-0051565 filed in the Republic of Korea on May 7, 2013, and Korean Patent Application No. 10-2014-0054279 filed in the Republic of Korea on May 7, 2014, the disclosure of which is incorporated herein by reference.

TECHNICAL FIELD

The present disclosure relates to an electrode for a secondary battery, more specifically to an electrode for a secondary battery which can be prevented from the release of an electrode active material layer and have improved flexibility, a method of preparing the electrode, and a secondary battery and a cable-type secondary battery comprising the electrode.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter. The cable-type batteries are easy in shape variation, while being subject to stress due to external force for the shape variation. Also, the electrode active material layer of cable-type batteries may be released by rapid volume expansion during charging and discharging processes. From these reasons, the capacity of the batteries may be reduced and the cycle life characteristics thereof may be deteriorated.

Such a problem may be solved in a certain degree by increasing the amount of a binder used in the electrode active material layer to provide flexibility during bending or twisting. However, the increase of a binder amount in the electrode active material layer causes an electrode resistance rise to deteriorate battery performances. Also, when intense external forces are applied, for example, in the case that electrodes are completely folded, the release of the electrode active material layer cannot be prevented even though the amount of a binder becomes increased. Therefore, this method is insufficient to solve such problems.

SUMMARY OF THE DISCLOSURE

The present disclosure is designed to solve the problems of the related art, and therefore the present disclosure is directed to providing an electrode for a secondary battery which can be mitigated from crack generation in an electrode active material layer by external forces, and also can be prevented from the release of the electrode active material layer from a current collector even if severe cracks are present, a method of preparing the electrode, and a secondary battery and a cable-type secondary battery comprising the electrode. In accordance with one aspect of the present disclosure, there is provided a sheet-form electrode for a secondary battery, comprising a current collector;

an electrode active material layer formed on one surface of the current collector; a porous organic-inorganic layer formed on the electrode active material layer and comprising inorganic particles and a polymer binder; and a first porous supporting layer formed on the porous organic-inorganic layer.

The current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

Also, the current collector may be in the form of a mesh.

In addition, the current collector may further comprise a primer coating layer consisting of a conductive material and a binder. The conductive material may comprise any one selected from the group consisting of carbon black, acetylene black, ketjen black, carbon fiber, carbon nanotube, graphene and a mixture thereof.

The binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Further, the current collector may have a plurality of recesses on at least one surface thereof.

The plurality of recesses may be continuously patterned or intermittently patterned, on at least one surface thereof.

The continuous patterned recesses may be formed with spacing apart with each other in the longitudinal direction.

The intermittently patterned recesses may be formed by a plurality of holes.

The plurality of holes may be a circular or polygonal shape.

Meanwhile, the first supporting layer may be a mesh-form porous membrane or a non-woven fabric.

The first supporting layer may be made of any one selected from the group consisting of high-density polyethylene, low-density polyethylene, linear low-density polyethylene, ultra-high molecular weight polyethylene, polypropylene, polyethylene terephthalate polybutylene terephthalate, polyester, polyacetal, polyamide, polycarbonate, polyimide polyetheretherketone, polyethersulfone, polyphenylene oxide, polyphenylene sulfide, polyethylene naphthalate, and a mixture thereof.

Also, the electrode may further comprise a conductive material-coating layer having a conductive material and a binder on the first supporting layer.

In the conductive material-coating layer, the conductive material and the binder may be present in a weight ratio of 80:20 to 99:1.

The conductive material may comprise any one selected from the group consisting of carbon black, acetylene black, ketjen black, carbon fiber, carbon nanotube, graphene and a mixture thereof.

The binder may be selected from the group consisting of polyvinylidene fluoride (PVDF), polyvinylidene fluoride-co-hexafluoro propylene, polyvinylidene fluoride-co trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Meanwhile, the porous organic-inorganic layer may be formed from a mixture of the inorganic particles and the polymer binder in a weight ratio of 20:80 to 95:5.

Also, the porous organic-inorganic layer may have a pore size of 0.01 to 10 μm and a porosity of 5 to 95%.

The inorganic particles may be inorganic particles having a dielectric constant of 5 or higher, inorganic particles having the ability to transport lithium ions, or a mixture thereof.

Examples of the inorganic particles having a dielectric constant of 5 or higher include $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $SiC$, $SiO_2$, $AlOOH$, $Al(OH)_3$, $TiO_2$, and a mixture thereof.

Also, examples of the inorganic particles having the ability to transport lithium ion include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The inorganic particles may have an average diameter of 10 nm to 5 μm.

Also, the polymer binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

The electrode may further comprise a porous coating layer formed on the first porous supporting layer and comprising a mixture of inorganic particles and a binder polymer.

The electrode may further comprise a second supporting layer formed on another surface of the current collector.

The second supporting layer may be a polymer film.

The polymer film may be made of any one selected from the group consisting of polyolefin, polyester, polyimide, polyamide and a mixture thereof. When the electrode for a secondary battery is used as an anode, the electrode active material layer may comprise, an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and when the electrode for a secondary battery is used as a cathode, the electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0\le x<0.5$, $0\le y<0.5$, $0\le z<0.5$, and $x+y+z\le 1$), and a mixture thereof.

In accordance with another aspect of the present disclosure, there is provided a method of preparing a sheet-form electrode for a secondary battery, comprising (S1) applying a slurry containing an electrode active material on one surface of the current collector, followed by drying, to form an electrode active material layer, (S2) applying a mixed organic-inorganic slurry containing inorganic particles and a polymer binder on the electrode active material layer; (S3) forming a first porous supporting layer on the mixed organic-inorganic slurry which is applied; and (S4) compressing the resultant obtained in step (S3) to form a porous organic-inorganic layer which is adhered between the electrode active material layer and the first porous supporting layer to be integrated with each other.

In the step (S3), forming a first porous supporting layer on the mixed organic-inorganic slurry may be carried out before the binder polymer is cured.

In the step (S4), compressing the resultant obtained in step (S3) to form a porous organic-inorganic layer which is adhered between the electrode active material layer and the first porous supporting layer to be integrated with each other may be carried out before the binder polymer is cured.

The method may further comprise forming a second supporting layer by compression on another surface of a current collector; before the (S1) step or after the (S4) step.

Also, in accordance with yet another aspect of the present disclosure, there is provided a secondary battery comprising a cathode, an anode, a separator interposed between the cathode and the anode, and a non-aqueous electrolyte solution, wherein at least one of the cathode and the anode is the above-mentioned electrode for a secondary battery according, to the present disclosure.

The secondary battery may be formed as a stacking, winding, stacking/folding, or cable type secondary battery.

In addition, in accordance with yet still another aspect of the present disclosure, there is provided a cable-type secondary battery, comprising: an inner electrode; a separation layer surrounding the outer surface of the inner electrode to prevent a short circuit between electrodes; and a outer electrode surrounding the outer surface of the separation layer and formed by being spirally wound, wherein at least one of the inner electrode and the outer electrode is formed using the above-mentioned electrode for a secondary battery according to the present disclosure.

The outer electrode may be in the form of a uniaxially extended strip.

The outer electrode may be spirally wound so that it is not overlapped in its width.

The outer electrode may be spirally wound with space within the double length of its width so that it is not overlapped.

The outer electrode may be spirally wound so that it is overlapped in its width.

The outer electrode may be spirally wound so that the width of its overlapped part is within 0.9 folds of the width of the outer electrode itself.

The inner electrode may be a hollow structure whose central part is empty.

One or more electrodes according to the present disclosure may be spirally wound as the inner electrode.

The inner electrode may be provided with a core of inner current collector, a core for supplying lithium ions, which comprises an electrolyte, or a filling core therein The core of inner current collector may be made of carbon nanotube, stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer.

The core for supplying lithium ions may comprise a gel polymer electrolyte and a support.

The core for supplying lithium ions may comprise a liquid electrolyte and a porous carrier. The electrolyte which is used in the core for supplying lithium ions may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

The electrolyte may further comprise a lithium salt which may be selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

The filling core may be made of polymer resins, rubber and inorganics in the form of a wire, a fiber, a powder, a mesh and a foam.

The inner electrode may be an anode or a cathode, and the outer electrode may be a cathode or an anode corresponding to the inner electrode.

Meanwhile, the separation layer may be an electrolyte layer or a separator.

The electrolyte layer may comprise an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt, which may be selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof.

The separator may be a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting or polyesters, polyacetals, polyamides, polycarbonates, polyimides, polyether ether ketones, polyether sulfones polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

The porous polymer substrate may be a porous polymer film substrate or a porous nonwoven fabric substrate.

The cable-type secondary battery may further comprise a protection coating surrounding the outer surface of the outer electrode.

The protection coating may be made of a polymer resin.

The polymer resin may comprise any one selected from the group consisting of PET, PVC, HDPE, an epoxy resin and a mixture thereof.

The protection coating may further comprise a moisture-blocking layer.

The moisture-blocking layer may be made of aluminum or a liquid-crystalline polymer.

Further, in accordance with yet still another aspect of the present invention, there is provided a cable-type secondary battery, comprising: a core for supplying lithium ions, which comprise an electrolyte; an inner electrode formed by being spirally wound to surround the outer surface of the core for supplying lithium ions, and wherein the inner electrode comprises a current collector and an electrode active material layer; a separation layer surrounding the outer surface of the inner electrodes to prevent a short circuit between electrodes; and an outer electrode formed by being spirally wound to surround the outer surface of the separation layer, wherein the outer electrode comprises a current collector and an electrode active material layer, wherein at least one of the inner electrode and the outer electrode is formed using the above-mentioned electrode for a secondary battery according to the present disclosure.

Further, in accordance with yet still another aspect of the present invention, there is provided a cable-type secondary battery, comprising: two or more inner electrodes arranged in parallel to each other; a separation layer surrounding the outer surface of the inner electrodes to prevent a short circuit between electrodes; and an outer electrode surrounding the outer surface of the separation layer and formed by being spirally wound, wherein at least one of the inner electrode and the outer electrode is formed using the above-mentioned electrode for a secondary battery according to the present disclosure.

Further, in accordance with yet still another aspect of the present invention, there is provided a cable-type secondary battery comprising; two or more cores for supplying lithium ions, which comprise an electrolyte; two or more inner electrodes arranged in parallel to each other, each inner electrode surrounding the outer sin face of each core for supplying lithium ions and comprising a current collector and an electrode active material layer; a separation layer surrounding the outer surface of the inner electrodes to prevent a short circuit between electrodes; and an outer electrode surrounding the outer surface of the separation layer and formed by being spirally wound, which the outer electrode comprises a current collector and an electrode active material layer, wherein at least one of the inner electrode, and the outer anode is formed using the above-mentioned electrode for a secondary battery according to the present disclosure.

One or more electrodes according to the present disclosure may be spirally wound as the inner electrode.

Thus, the sheet-form electrode for a secondary battery according to the present disclosure has supporting layers on at least one surfaces thereof to exhibit surprisingly improved flexibility.

The supporting layers act as a buffer when intense external forces are applied to the electrode, e.g., during the complete folding of the electrode, to reduce crack generation in an electrode active material layer even though the amount of a binder in the electrode active material layer is not raised. Thereby, the release of the electrode active material layer from a current collector can be prevented.

Accordingly, the sheet-form electrode can prevent a decrease in battery capacity and can improve the cycle life characteristic of batteries.

Also, the sheet-form electrode has a porous organic-inorganic layer on the top surface of its electrode active material layer to allow good introduction of an electrolyte solution in an electrode active material layer, thereby inhibiting a resistance rise in the electrode.

Further, as the porous supporting layer is provided, the electrolyte solution can be impregnated into the pores of the porous supporting layer to inhibit a resistance rise in the battery, thereby preventing the deterioration of battery performances.

BRIEF DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

<Explanation of Reference Numerals>

| | |
|---|---|
| 10: Current collector | 20: Electrode active material layer |
| 30: Porous organic-inorganic layer | 30': Mixed organic-inorganic slurry |
| 40: First supporting layer | 50: Second supporting layer |
| 60: Coating blade | |
| 100, 200: Cable-type secondary battery | |
| 110, 210: Core for supplying lithium ions | |
| 120, 220: Inner current collector | |
| 130, 230: Inner electrode active material layer | |
| 140, 240: Porous organic-inorganic layer | |
| 150, 250: First supporting layer | |
| 160, 260: Second supporting layer | |
| 170, 270: Separation layer | |
| 180, 280: Outer electrode active material layer | |
| 190, 290: Outer current collector | |
| 195, 295: Protection coating | |

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
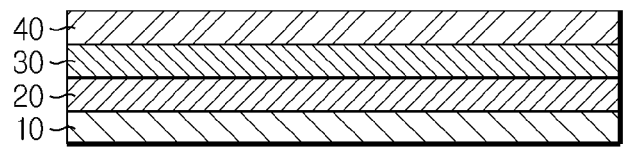
FIG. 1 shows a cross-section of a sheet-form electrode for a secondary battery according to one embodiment of the present disclosure.
Figure 2:
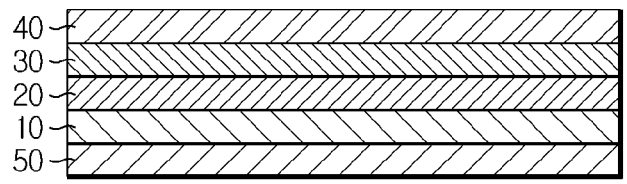
FIG. 2 shows a cross-section of a sheet-form electrode for a secondary battery according to another embodiment of the present disclosure.
Figure 3:
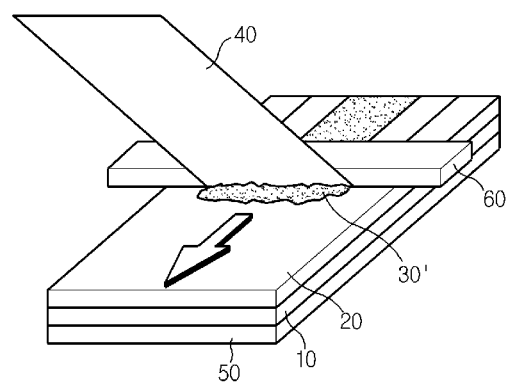
FIG. 3 schematically shows a method of preparing a sheet-form electrode for a secondary battery according to one embodiment of the present disclosure.

FIGS. 1 and 2 show a cress-section of a sheet-form electrode for a secondary battery according to one embodiment of the present disclosure, and FIG. 3 schematically shows a preferred method of preparing a sheet-form electrode for a secondary battery according to one embodiment of the present disclosure.

Referring FIGS. 1 to 3, a sheet-form electrode for a secondary battery according to the present disclosure comprises a current collector 10; an electrode active material layer 20 formed on one surface of the current collector 10; a porous organic-inorganic layer 30 formed on the electrode active material layer 20 and comprising inorganic particles and a polymer binder; and a first porous supporting layer 40 formed on the porous organic-inorganic layer 30.

And, the sheet-form electrode for a secondary battery according to one embodiment of the present disclosure may comprise a second supporting layer 50 formed on the another surface of the current collector 10

In order for a battery to have flexibility, electrodes used in the battery should have sufficient flexibility. However, in the case of conventional cable-type batteries being one example of flexible batteries, an electrode active material layer is apt to be released by stress due to external force for the shape variation, or by its rapid volume expansion during charging and discharging processes when a high-capacity anode active material containing Si, Sn or the like is used. Such a release of the electrode active material layer reduces battery capacity and deteriorates cycle life characteristics. As an attempt for overcoming this problem, the amount of a binder in the electrode active material layer has been raised to provide flexibility during bending or twisting.

However, the increase of a binder amount in the electrode active material layer causes an electrode resistance rise to deteriorate battery performances. Also, when intense external forces are applied, for example, in the case that electrodes are completely folded, the release of the electrode active material layer cannot be prevented even though the amount of a binder becomes increased. Therefore, this method is insufficient to solve such problems.

For the purpose of overcoming the above-mentioned problems, the present inventors have designed the electrode for a secondary battery in the form of a sheet by comprising the first supporting layer 40 formed on the outer surface thereof, and additionally the second supporting layer 50 formed on the another surface of the current collector 10.

That is, even if the electrode is applied by external forces during bending or twisting, the first supporting layer 40 having porosity acts as a buffer capable of mitigating the external forces applied to the electrode active material layer 20, to prevent the release of the electrode active material layer 20, thereby improving the flexibility of the electrode. Also, the second supporting layer 50, which may further be formed, can inhibit a short circuit of the current collector 10, thereby more improving the flexibility of the electrode.

Furthermore, the electrode of the present disclosure comprises a porous organic inorganic layer 30 as an adhesive for adhering the first porous supporting layer 40 with the electrode active material layer to be integrated with each other, the porous organic-inorganic layer 30 being obtained by drying a slurry containing inorganic particles and a polymer binder.

If a general binder is used as the adhesive, it acts as a resistant of the electrode to deteriorate battery performances. In contrast, the porous organic-inorganic layer 30 having a porous structure allows good introduction of an electrolyte solution in an electrode active material layer, thereby inhibiting a resistance rise in the electrode. Hereinafter, a method of preparing the sheet-form electrode for a secondary battery will be explained with reference to FIGS. 1 3. For your information, although FIG. 3 represents one case of forming a porous organic-inorganic layer after a second supporting layer 50 is previously formed on the under surface of the current collector 10, this is just one embodiment of the present disclosure. Therefore, as mentioned below, a porous organic-inorganic layer may be formed in the condition that a second supporting layer 50 is not formed.

First, a slurry (20') containing an electrode active material is applied on the other surface of the current collector 10, followed by drying, to form an electrode active material layer (S1).

The current collector 10 may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

As mentioned above, when secondary batteries are subject to external forces by bending or twisting, an electrode active material layer may be released from a current collector. For this reason, large amounts of binder components are used in the electrode active material layer so as to provide flexibility in electrodes. However, large amounts of binder may be easily peeled off owing to swelling by an electrolyte solution, thereby deteriorating battery performances.

Accordingly, for the purpose of improving adhesiveness between an electrode active material layer and a current collector, the current collector 10 may further comprise a primer coating layer consisting of a conductive material and a binder.

The conductive material may comprise any one selected from the group consisting of carbon black, acetylene black, ketjen black, carbon fiber, carbon nanotube, graphene and a mixture thereof, but is not limited thereto.

The binder may be selected from the group consisting of polyvinylidene fluoride (PVDF), polyvinylidene fluoride-co-hexafluoro propylene, polyvinylidene fluoride-co-trichloro-ethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof, but is not limited thereto.

Figure 4:
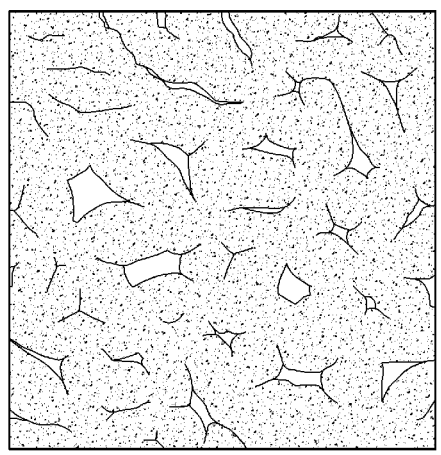
FIG. 4 shows a surface of a mesh-form current collector according to one embodiment of the present disclosure.
Figure 5:
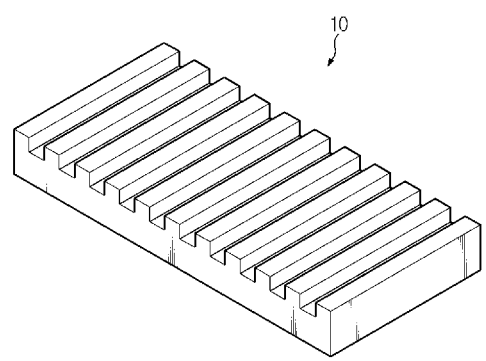
FIG. 5 schematically shows a surface of a current collector having a plurality of recesses, according to one embodiment of the present disclosure.
Figure 6:
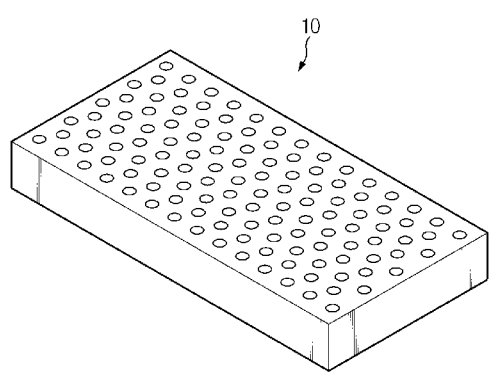
FIG. 6 schematically shows a surface of a current collector having a plurality of recesses, according to another embodiment of the present disclosure.

Also, referring to FIGS. 4 to 6, the current collector may be in the form of a mesh, and may have a plurality of recesses on at least one surface thereof so as to more increase its surface area. The recesses may be continuously patterned or intermittently patterned. That is, continuous patterned recesses may be formed with spacing apart with each other in the longitudinal direction, or a plurality of holes may be formed in the form of intermittent patterns. The plurality of holes may be a circular or polygonal shape.

In the present disclosure, when the electrode for a secondary battery is used as an anode, the electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and when the electrode for a secondary battery is used as a cathode, the electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Then, a slurry (30') containing inorganic particles and a polymer binder is applied on the electrode active material layer 20 (S2).

The mixed organic-inorganic slurry (30') is used as an adhesive. If only a general adhesive is used as the adhesive, it fails to form pores, making it difficult for an electrolyte solution to be introduced in the electrode active material layer, and therefore acts as a resistant of the electrode to deteriorate battery performances.

The mixed organic-inorganic slurry (30') forms a porous organic-inorganic layer 30 later, and it is obtained by mixing the inorganic particles and the polymer binder in a weight ratio of 20:80 to 95:5.

The inorganic particles may be inorganic particles having a dielectric constant of 5 or higher, inorganic particles having the ability to transport lithium ions, or a mixture thereof.

Examples of the inorganic particles having a dielectric constant of 5 or higher include $BaTiO_3$, $Pb(Zr_xTi_{1-x})O_3$(PZT, $0<x<1$), $Pb_{1-x}La_xZr_{1-y}O_3$(PLZT, $0<x<1$, $0<y<1$), $(1-x)Pb(Mg_{1/3}Nb_{2/3})O_3$-$xPbTiO_3$(PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $SiO_2$, AlOOH, $Al(OH)_3$, $TiO_2$ and a mixture thereof.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$ $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The inorganic particles may have an average diameter of 10 nm to 5 μm.

Also, the polymer binder may be selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof, but is not limited thereto.

Then a first porous supporting layer 40 is placed on the slurry which is applied as the above-mentioned (30')

Meanwhile, the first supporting layer 40 may be a mesh-form porous membrane or a non-woven fabric. Such a porous structure allows good introduction of an electrolyte solution in the electrode active material layer 20, and also the first supporting layer 40 itself has superior impregnation of the electrolyte solution to provide good ionic conductivity, thereby preventing an electrode resistance rise and eventually preventing the deterioration of battery performances.

The first supporting layer 40 may be made of any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

Also, the first supporting layer 40 may further comprise a conductive material-coating layer having a conductive material and a binder on the top surface thereof. The conductive material-coating layer functions to improve the conductivity of an electrode active material layer and reduce electrode resistance, thereby preventing the deterioration of battery performances.

The conductive material and the binder used in the conductive material-coating layer may be the same as those used in the primer coating layer, which are mentioned above.

Such conductive material-coating layer is more favorable when applied in a cathode because a cathode active material layer has low conductivity to intensify performance deterioration due to electrode resistance rise, than in an anode whose active material layer has relatively good conductivity and thus is not largely affected by the conductive material-coating layer to exhibit performances similar to conventional anodes.

In the conductive material-coating layer, the conductive material and the binder may be present in a weight ratio of 80:20 to 99:1. The use of large amounts of binder may induce a severe rise in electrode resistance. Therefore, when such a numerical range is satisfied, electrode resistance can be prevented from its severe rise. Also, as mentioned above, since the first supporting layer acts as a buffer which can prevent the release of an electrode active material layer, electrode flexibility is not largely affected by the use of the binder in a relative small amount.

Subsequently, the resultant obtained in step (S3) is compressed to form a porous organic-inorganic layer 30 which is adhered between the electrode active material layer 20 and the first, supporting layer 40 to be integrated with each other (S4).

The porous organic-inorganic layer 30 may have a porous structure for good introduction of an electrolyte solution in an electrode active material layer, and have pore size of 0.01 to 10 μM and a porosity of 5 to 95%.

The porous coating layer may be formed to have a porous structure through phase separation or phase change by a non-solvent during its preparation, or may be formed by interstitial volumes between the inorganic particles, the interstitial volumes being generated from the state that the inorganic particles are connected and immobilized by the polymer binder.

Meanwhile, if the porous organic-inorganic layer 30 is formed by coating the mixed organic-inorganic slurry (30') on one surface of the electrode active material layer 20, followed by drying, and then the first supporting layer 40 is formed by lamination thereon, the binder component in the shiny (30') for adhering the electrode active material layer 20 with the first supporting layer 40 may be cured, making it difficult to maintain strong adhesion between such two layers.

Also, unlike the preferred preparation method of the present disclosure which uses the first porous supporting layer prepared in advance, if a porous supporting layer is formed by coating a polymer solution on the porous organic-inorganic layer, such a porous supporting layer formed by coating the polymer solution has poor mechanical properties than those of the first porous supporting layer of the present disclosure, thereby failing to effectively prevent the release of the electrode active material layer.

In contrast, according to the preferred preparation method of the present disclosure, in the case that the first supporting layer 40 is placed on the top of the mixed organic-inorganic slurry (30') before the binder component is cured, and then these are together coated by means of a coating blade 60, thereby forming the porous organic-inorganic layer 30 adhered between the electrode active material layer 20 and the first supporting layer 40 to be integrated with each other.

Meanwhile, the method according to one embodiment of the present disclosure may comprise forming a second supporting layer (50) by compression on another surface of a current collector; before the (S1) step or after the (S4) step. The second supporting layer (50) can inhibit a short circuit of the current collector 10.

Meanwhile, the second supporting layer 50 may be a polymer film which may be made of any one selected from the group consisting of polyolefin, polyester, polyimide, polyamide and a mixture thereof. In addition, the present disclosure provides a secondary battery comprising a cathode, an anode, a separator interposed between the cathode and the anode, and anon-aqueous electrolyte solution, wherein at least one of the cathode and the anode is the above-mentioned electrode for a secondary battery.

The secondary battery of the present disclosure may be in the general form of stacking, winding or stacking/folding, and also it may be in the particular form of cable type.

Meanwhile, a cable-type secondary battery according to one aspect of the present disclosure comprises an inner electrode; a separation layer surrounding the outer surface of the inner electrode to prevent a short circuit between electrodes; and an outer electrode surrounding the outer surface of the separation layer and formed by being spirally wound, wherein at least one of the inner electrode and the outer electrode is formed using the electrode according to one embodiment of the present disclosure The term 'spirally' used herein refers to represent a helix shape that turns around at a certain area while moving, including general spring forms.

The outer electrode may be in the form of a uniaxially extended strip.

Also, the outer electrode may be spirally wound so that it is not overlapped in its width or overlapped in its width. For example, in order to prevent the deterioration of battery performances, the sheet-form outer electrode may be spirally wound with space within the double length of its width so that it is not overlapped.

Alternatively, the outer electrode may be spirally wound while overlapping in its width. In this case, in order to inhibit an excessive resistance rise within the battery, the sheet-form outer electrode may be spirally wound so that the width of its overlapped part may be within 0.9 folds of the width of the sheet-form outer electrode itself.

The inner electrode may be a hollow structure whose central part is empty.

The inner current collector comprised in the inner electrode may be one or more wires being spirally wound or one or more sheets being spirally wound.

Alternatively, the inner current collector may be two or more wires being spirally crossed with each other.

Also, the inner electrode may be provided with a core of inner current collector therein.

The core of inner current collector may be made of carbon nanotube, stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer.

Alternatively, the inner electrode may be provided with a core for supplying lithium ions, which comprises an electrolyte therein.

The core for supplying lithium ions may comprise a gel polymer electrolyte and a support.

Also, the core for supplying lithium ions may comprise a liquid electrolyte and a porous carrier.

Alternatively, the inner electrode may be provided with a filling core therein.

Figure 7:
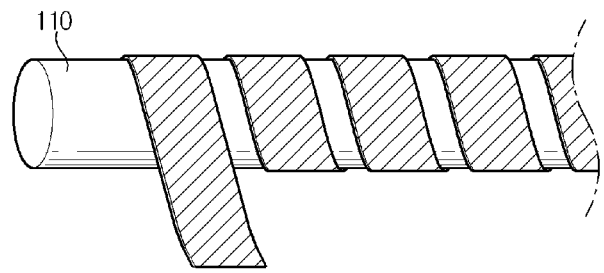
FIG. 7 schematically shows a sheet-form inner electrode being wound on the outer surface of a core for supplying lithium ions in the cable-type secondary battery of the present disclosure.

The filling core may be made of several materials for improving various performances of cable-type batteries, for example polymer resins, rubber and inorganics, besides materials forming the core of inner current collector and the core for supplying lithium ions, and also may have various forms including wire, fiber, powder, mesh and foam. Meanwhile, FIG. 7 schematically shows a cable-type secondary battery according to one embodiment of the present disclosure in which a sheet-form inner electrode is wound on the outer surface of a core 110 for supplying lithium ions. The sheet-form inner electrode may be applied in cable-type secondary batteries as shown in FIG. 6, and also the sheet-form outer electrode may be similarly wound on the outer surface of a separation layer.

Such a cable-type secondary battery according to one embodiment of the present disclosure comprises a core for supplying lithium ions, which comprises an electrolyte; an inner electrode surrounding the outer surface of the core for supplying lithium ions and comprising a current collector and an electrode active material layer; a separation layer surrounding the outer surface of the inner electrode to prevent a short circuit between electrodes; and an outer electrode surrounding the outer surface of the separation layer and formed by being spirally wound, which comprises a current collector and an electrode active material layer, wherein at least one of the inner electrode and the outer anode is the above-mentioned electrode for a secondary battery according to the present disclosure.

The term 'a predetermined shape' used herein is not limited to any particular shape, and refers to any shape that does not damage the nature of the present disclosure. The cable-type secondary battery according to one embodiment of the present disclosure may have a horizontal cross section of a predetermined shape, a linear structure, which extends in the longitudinal direction. The cable-type secondary battery according to one embodiment of the present disclosure may have flexibility, so it can freely change in shape.

Figure 8:
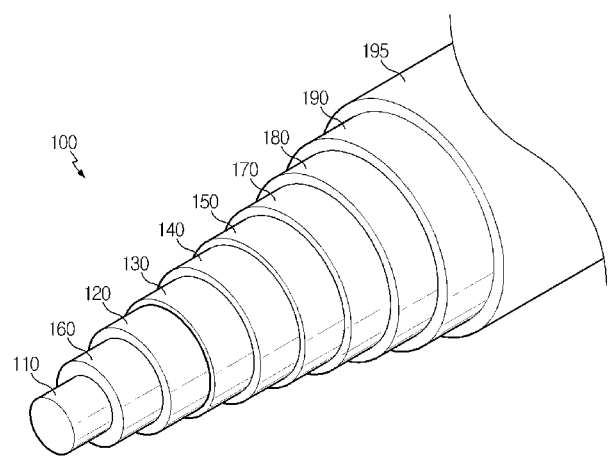
FIG. 8 is an exploded perspective view schematically showing the inside of a cable-type secondary battery according to one embodiment of the present disclosure.

Among cable-type secondary batteries which can be designed by the present disclosure, a cable-type secondary battery 100 in which the above-mentioned electrode for a secondary battery is used as an inner electrode is shown in FIG. 8.

Referring to FIG. 8, the cable-type secondary battery 100 comprises a core 110 for supplying lithium ions, which comprises an electrolyte; an inner electrode surrounding the outer surface of the core 110 for supplying lithium ions; a separation layer 170 surrounding the outer surface of the inner electrode to prevent a short circuit between electrodes; and an outer electrode formed by being spirally wound to surround the outer surface of the separation layer 170 and comprising an outer current collector 190 and an outer electrode active material layer 180, wherein the inner electrode comprises an inner current collector 120, an inner electrode active material layer 130 formed on one surface of the inner current collector 120, a porous organic-inorganic layer 140 formed on the top surface of the inner electrode active material layer 130 and comprising inorganic particles and a polymer binder, a first porous supporting layer 150 formed on the top surface of the porous organic-inorganic layer 140, and a second supporting layer 160 formed on the other surface of the inner current collector 120.

As already mentioned above, the sheet-form electrode for a secondary battery according to the present disclosure may be used as the outer electrode, not the inner electrode, or may be used as both of them.

The core 110 for supplying lithium ions comprises an electrolyte which is not particularly limited to its kinds and may be selected from a ion-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc). Also, the electrolyte may further comprise a lithium salt which may be selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof. The core 110 for supplying lithium ions may consist of only an electrolyte, and especially a liquid electrolyte may be formed by using a porous carrier.

In the present disclosure, the inner electrode may be an anode or a cathode, and the outer electrode may be a cathode or an anode corresponding to the inner electrode.

Electrode active materials which may be used in the anode and the cathode are the same as those which are mentioned above.

Meanwhile, the separation layer may be an electrolyte layer or a separator.

The electrolyte layer serving as an ion channel may be made of a gel-type polymer electrolyte using PEO, PVdF, PVdF-HFP, PMMA, PAN or PVAc, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a support to improve poor mechanical properties, and a porous support or a cross-linked polymer may be used as such support. The electrolyte layer of the present invention can serve as a separator, and thus an additional separator may be omitted.

In the present disclosure, the electrolyte layer may further comprise a lithium salt. The lithium salt can improve an ionic conductivity and response time. Non-limiting examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

Examples of the separator may include, but is not limited to, a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous polymer substrate made of a mixture of inorganic particles and a binder polymer; or a separator having a porous coating layer formed on at least one surface of the porous polymer substrate and comprising inorganic particles and a binder polymer.

In the porous coating layer formed from inorganic particles and a binder polymer, the inorganic particles are bound to each other by the binder polymer (i.e., the binder polymer connects and immobilizes the inorganic particles), and also the porous coating layer maintains the state of binding with the first supporting layer by the binder polymer, In such a porous coating layer, the inorganic panicles are filled in contact with each other, from which interstitial volumes are formed between the inorganic particles. The interstitial volumes between the inorganic particles become empty spaces to form pores.

Among these, in order for the lithium ions of the core for supplying lithium ions to be transferred to the outer electrode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

Also, the cable-type secondary battery of the present disclosure has a protection coating 195. The protection coating 195 acts as an insulator and is formed to surround the outer current collector, thereby protecting the electrodes against moisture in the air and external impacts. The protection coating may be made of conventional polymer resins having a moisture-blocking layer. The moisture-blocking layer may be made of aluminum or a liquid-crystalline polymer which have good water-blocking ability, and the polymer resins may be PET, PVC, HDPE or epoxy resins.

Further, a cable-type secondary battery according to one aspect of the present disclosure comprises: two or more inner electrodes arranged in parallel to each other; a separation layer surrounding the outer surface of the inner electrodes to prevent a short circuit between electrodes; and an outer electrode surrounding the outer surface of the separation layer and formed by being spirally wound, wherein at least one of the inner electrode and the outer electrode is formed using the above-mentioned electrode for a secondary battery according to the present disclosure.

Further a cable-type secondary battery according to one aspect of the present disclosure comprises: two or more cores for supplying lithium ions, which comprise an electrolyte; two or more inner electrodes arranged in parallel to each other, each inner electrode surrounding the outer surface of each core for supplying lithium ions and comprising a current collector and an electrode active material layer; a separation layer surrounding the outer surface of the inner electrodes to prevent a short circuit between electrodes; and an outer electrode surrounding the outer surface of the separation layer and formed by being spirally wound, which the outer electrode comprises a current collector and an electrode active material layer, wherein at least one of the inner electrode and the outer anode is formed using the above-mentioned electrode for a secondary battery according to the present disclosure.

Figure 9:
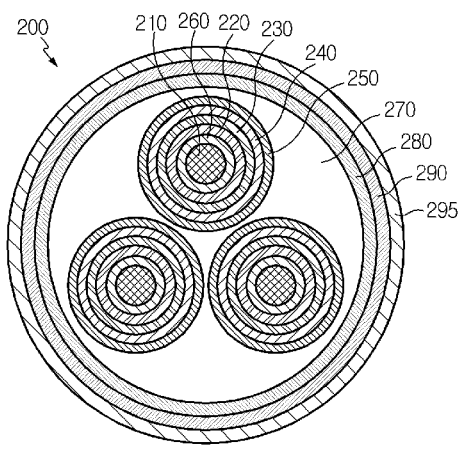
FIG. 9 schematically shows a cross-section of a cable-type secondary battery having a plurality of inner electrodes according to the present disclosure.

Among cable-type secondary batteries having two or more inner electrodes which can be designed by the present disclosure, a cable-type secondary battery 200 in which the above-mentioned electrode for a secondary battery is used as an inner electrode is shown in FIG. 9.

Referring to FIG. 9, the cable-type secondary battery 200 comprises two or more cores 210 for supplying lithium ions, which comprise an electrolyte; two or more inner electrodes arranged in parallel to each other, each inner electrode surrounding the outer surface of each core for supplying lithium ions; a separation layer 270 surrounding the outer surface of the inner electrodes to prevent a short circuit between electrodes; and an outer electrode surrounding the outer surface of the separation layer 270 and formed by being spirally wound, which the outer electrode comprises an outer current collector 290 and an outer electrode active material layer 280, wherein each inner electrode comprises an inner current collector 220, an inner electrode active material layer 230 formed on one surface of the inner current collector 220, a porous organic-inorganic layer 240 formed on the top surface of the inner electrode active material layer 230 and comprising inorganic particles and a polymer binder, a first porous supporting layer 250 formed on the top surface of the porous organic-inorganic layer 240, and a second supporting layer 260 formed on the other surface of the inner current collector 220.

As already mentioned above, the sheet-form electrode for a secondary battery according to the present disclosure may be used as the outer electrode, not the inner electrode, or may be used as both of them.

In the cable-type secondary battery 200 which has a plurality of inner electrodes, the number of the inner electrodes can be adjusted to control the loading amount of the electrode active material layers as well as battery capacity, and a probability of short circuit can be prevented owing to the presence of multiple electrodes.

APPLICABILITY TO THE INDUSTRY

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A secondary battery comprising a cathode, an anode, a separator interposed between the cathode and the anode, and a non-aqueous electrolyte solution,
wherein at least one of the cathode and the anode is a sheet-form electrode for a secondary battery, comprising a current collector, an electrode active material layer formed on one surface of the current collector, a porous organic-inorganic layer formed on the electrode active material layer and comprising inorganic particles and a polymer binder, and a first porous supporting layer formed on the porous organic-inorganic layer.

2. The secondary battery according to claim 1, wherein the secondary battery is formed as a stacking, winding, stacking/folding, or cable type secondary battery.

3. A cable-type secondary battery, comprising:
a core for supplying lithium ions, which comprise an electrolyte;
an inner electrode formed by being helically wound to surround an outer surface of the core for supplying lithium ions, and wherein the inner electrode comprises a current collector and an electrode active material layer;
a separation layer surrounding an outer surface of the inner electrode to prevent a short circuit between electrodes; and
an outer electrode formed by being helically wound to surround an outer surface of the separation layer, wherein the outer electrode comprises a current collector and an electrode active material layer,
wherein at least one of the inner electrode and the outer electrode is formed using a sheet-form electrode for a secondary battery, comprising the respective current collector, the respective electrode active material layer formed on one surface of the respective current collector, a porous organic-inorganic layer formed on the respective electrode active material layer and comprising inorganic particles and a polymer binder, and a first porous supporting layer formed on the porous organic-inorganic layer.

4. The cable-type secondary battery according to claim 3, wherein the at least one of the inner electrode and the outer electrode further comprises a second supporting layer formed on another surface of the respective current collector.

5. The cable-type secondary battery according to claim 4, wherein the second supporting layer is a polymer film.

6. The cable-type secondary battery according to claim 5, wherein the polymer film is made of any one selected from the group consisting of polyolefin, polyester, polyimide, polyamide and a mixture thereof.

7. The cable-type secondary battery according to claim 3, wherein the outer electrode is in the form of a uniaxially extended strip.

8. The cable-type secondary battery according to claim 3, wherein the outer electrode is helically wound so that it does not overlap itself.

9. The cable-type secondary battery according to claim 8, wherein the outer electrode is helically wound so that each pass of its helical winding is separated by a space.

10. The cable-type secondary battery according to claim 3, wherein the inner electrode is an anode or a cathode, and the outer electrode is a cathode or an anode corresponding to the inner electrode.

11. The cable-type secondary battery according to claim 3, wherein the separation layer is an electrolyte layer or a separator.

12. The cable-type secondary battery according to claim 11, wherein the electrolyte layer comprises an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

13. The cable-type secondary battery according to claim 11, wherein the electrolyte layer further comprises a lithium salt.

14. The cable-type secondary battery according to claim 13, wherein the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

15. The cable-type secondary battery according to claim 11, wherein the separator is a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

16. The cable-type secondary battery according to claim 15, wherein the porous polymer substrate is a porous polymer film substrate or a porous non-woven fabric substrate.

17. The cable-type secondary battery according to claim 3, which further comprises a protection coating surrounding an outer surface of the outer electrode.

18. The cable-type secondary battery according to claim 17, wherein the protection coating is made of a polymer resin.

19. The cable-type secondary battery according to claim 18, wherein the polymer resin comprises any one selected from the group consisting of PET, PVC, HDPE, an epoxy resin and a mixture thereof.

20. The cable-type secondary battery according to claim 18, wherein the protection coating further comprises a moisture-blocking layer.

21. The cable-type secondary battery according to claim 20, wherein the moisture-blocking layer is made of aluminum or a liquid-crystalline polymer.

22. A cable-type secondary battery, comprising:
two or more cores for supplying lithium ions, which comprise an electrolyte;
two or more inner electrodes arranged in parallel to each other, each inner electrode surrounding an outer surface of one of the two or more cores for supplying lithium ions and comprising a current collector and an electrode active material layer;
a separation layer surrounding respective outer surfaces of the two or more inner electrodes to prevent a short circuit between electrodes; and
an outer electrode surrounding an outer surface of the separation layer and formed by being helically wound, wherein the outer electrode comprises a current collector and an electrode active material layer, wherein at least one of the two or more inner electrodes and the outer electrode is formed using a sheet-form electrode for a secondary battery, comprising the respective current collector, the respective electrode active material layer formed on one surface of the respective current collector, a porous organic-inorganic layer formed on the respective electrode active material layer and comprising inorganic particles and a polymer binder, and a first porous supporting layer formed on the porous organic-inorganic layer.

23. The cable-type secondary battery according to claim 22, wherein the two or more inner electrodes comprise two or more electrodes for a secondary battery being helically wound.

24. A method of preparing a secondary battery, comprising:
preparing a sheet-form electrode including:
(S1) applying a slurry containing an electrode active material on one surface of a current collector, followed by drying, to form an electrode active material layer;
(S2) applying a mixed organic-inorganic slurry containing inorganic particles and a polymer binder on the electrode active material layer;
(S3) forming a first porous supporting layer on the mixed organic-inorganic slurry which is applied; and
(S4) compressing the resultant obtained in step (S3) to form a porous organic-inorganic layer which is adhered between the electrode active material layer and the first porous supporting layer to be integrated with each other;
assembling a cathode, an anode, a separator interposed between the cathode and the anode, and a non-aqueous electrolyte solution, wherein at least one of the cathode and the anode is the sheet-form electrode.

25. The method according to claim 24, wherein in the step (S3), forming a first porous supporting layer on the mixed organic-inorganic slurry is carried out before the binder polymer is cured.

26. The method according to claim 24, wherein in the step (S4), compressing the resultant obtained in step (S3) to form a porous organic-inorganic layer which is adhered between the electrode active material layer and the first porous supporting layer to be integrated with each other is carried out before the binder polymer is cured.

27. The method according to claim 24, further comprising forming a second supporting layer by compression on another surface of the current collector either before the (S1) step or after the (S4) step.

* * * * *